2,768,268
INERT GAS ARC WELDING PROCESS

John B. Arthur, Montebello, Calif., assignor to North American Aviation, Inc.

No Drawing. Application November 5, 1953, Serial No. 390,421

5 Claims. (Cl. 219—74)

The present invention comprises a new and novel process for the fusion welding of high-strength, high-alloy aluminum. The invention specifically involves an inert gas arc welding procedure in which the aluminum parts to be joined are first fused and then welded using an inert gaseous arc.

It has been well established that satisfactory welding of high-strength, high-alloy aluminum is extremely difficult. The physical properties of such welded joints are low in value when compared to the parent metal. Failure of such joints occurs in the heat affected zones of the parent metal or interface connections between the parent metal and the filler metal. The area of failure generally is characterized by high porosity, voids, excessive grain growth, and excessive eutectic melting.

The instant invention solves the above difficulties by utilizing the basic combination of a fusion pass followed by a welding pass by an inert gaseous arc. The fusion pass can also advantageously employ an inert gaseous type of arc. It has been found that a high joint efficiency is attained by first fusing the aluminum alloy before the welding step. The joint is able to withstand repeated reverse bending and is ductile in the previously brittle, reduced strength zone. The over-all strength of the welded joint is greatly increased by incorporating the prior fusing step in combination with the inert gaseous arc welding step. Furthermore, the instant new and novel procedure reduces "scatter" thus giving a more uniform weld zone. The term "scatter" is used to describe a condition where various and scattered values of ultimate strength are present at various parts of a weld zone.

It is an object of this invention to provide a new process of welding high-strength, high-alloy aluminum.

A specific object of this invention is to provide a new process of welding aluminum which comprises fusing the aluminum before the actual welding step.

A further object of this invention is to provide a process of fusion welding high-strength aluminum parts utilizing a plurality of inert gaseous arcs.

Another object of this invention is to provide a process of making a high-strength aluminum joint in which abutting aluminum members are first fused together and then welded by an inert gaseous arc, filler metal being added during such welding step.

Other objects of invention will become apparent from the following description.

The instant inventive process incorporates a prior step of fusing juxtaposed aluminum parts before those aluminum parts are welded with the addition of a filler metal. The welding step is carried out using a conventional inert gaseous arc procedure in which an electric arc, blanketed in an atmosphere of an inert gas (helium or argon, or mixtures thereof) serves to melt filler metal and form a weld bead on the aluminum surfaces.

Optimum results are obtained in also utilizing an inert gaseous arc heating process in the fusing step. Thus the process may use a first inert gaseous arc which fuses, or partially fuses the joint together; and a second inert gaseous arc used in combination with a filler metal, which places a weld bead over the fused area. The invention further contemplates fusing the edges of the aluminum parts to be joined by other means, such as a seam welding operation. The width of the fuse pass and weld pass should be approximately the same. The spacing between the two arcs is not critical. Any number of weld passes of the straight or weave variety may be made after the fuse pass.

A variety of high-strength, high-alloy aluminums may be welded by the instant process. Commercial designations of these aluminum alloys include 24 ST–3, 14 ST, 61 ST and 75 ST. Suitable filler metals include designations 356 S, 56 S, 43 S and 24 S.

The instant process is not limited to any particular thickness of metal, nor is it limited to any particular type of joint or joining procedure.

The inert gaseous arc can be of the alternating current or direct current type using consumable or nonconsumable electrodes. The action of the inert gas arc tends to clean the surface of the aluminum material of any oxide formation by a process of electronic bombardment.

It is further comprehended by this invention that the fused zone, or weld zone, or both zones may be quenched by various means, such as $CO_2$ application, or ice, to give a stronger grain structure.

The incorporation of the fusing step before the welding step was found unexpectedly to give highly improved strength characteristics to the resultant bond. The fusing of the edges locks up the joints between the aluminum parts, effectively preventing weld porosity and voids. It has been further found that a better distribution of constituents and hence higher strength is attained when the parts are fused prior to the inert gas welding step.

Although the invention has been described and illustrated in detail, it is to be clearly understood that the same is by way of illustration and example only and is not to be taken by way of limitation, the spirit and scope of this invention being limited only by the terms of the appended claims.

I claim:

1. The process of making a high-strength high-alloy aluminum joint, comprising the steps of at least partially fusing the joint together by passing an inert gaseous arc thereover, and subsequently welding said joint by passing at least one other inert gaseous arc thereover while adding filler metal to said joint.

2. The method of welding high aluminum alloy parts, comprising the steps of positioning said parts with their joining edges in contact, passing an electric arc over said edges to at least partially fuse said edges together, and passing a second electric arc over said fused edges while adding filler metal to the weld zone to complete the welding of said edges, both of said arcs being of the inert gaseous type.

3. The method of welding aluminum and aluminum alloy parts, comprising the steps of positioning said parts with their joining edges in contact, passing an inert gaseous arc over said edges to form a fused joint, and passing a second inert gaseous arc over said fused joint to increase the strength of the fused joint, filler metal being added to the weld zone during the last mentioned passing step.

4. The method of fusion welding high aluminum alloy parts, comprising the steps of positioning said parts in juxtaposed relation, at least partially fusing said parts together, and inert gaseous arc welding a filler metal on the fused area.

5. The method of fusion welding aluminum and aluminum alloy parts, comprising the steps of positioning the parts, at least partially fusing said parts together, and passing at least one electric arc over the area of fusion while adding filler metal to said area, said area being blanketed in an atmosphere of inert shielding gas during said passing step.

References Cited in the file of this patent

UNITED STATES PATENTS

| | | |
|---|---|---|
| 1,298,590 | Smith | Mar. 25, 1919 |
| 1,495,272 | Stresau | May 27, 1924 |
| 1,554,546 | Austin | Sept. 22, 1925 |
| 2,031,138 | Taylor | Feb. 18, 1936 |
| 2,504,868 | Muller et al. | Apr. 18, 1950 |